(12) United States Patent
Radez

(10) Patent No.: US 8,990,771 B2
(45) Date of Patent: Mar. 24, 2015

(54) BUILDING AND DISTRIBUTING SOFTWARE PACKAGES

(75) Inventor: Daniel P. Radez, Apex, NC (US)

(73) Assignee: Red Hat, Inc., Raleigh, NC (US)

( * ) Notice: Subject to any disclaimer, the term of this patent is extended or adjusted under 35 U.S.C. 154(b) by 111 days.

(21) Appl. No.: 13/213,790

(22) Filed: Aug. 19, 2011

(65) Prior Publication Data

US 2013/0047138 A1 Feb. 21, 2013

(51) Int. Cl.
G06F 9/44 (2006.01)
G06F 9/445 (2006.01)

(52) U.S. Cl.
CPC ... G06F 8/61 (2013.01); G06F 8/71 (2013.01)
USPC ............ 717/121; 717/172; 717/173; 717/177

(58) Field of Classification Search
CPC ................................................ G06F 8/60–8/65
USPC ........... 717/120–123, 168–178; 709/221–224
See application file for complete search history.

(56) References Cited

U.S. PATENT DOCUMENTS

| | | | | |
|---|---|---|---|---|
| 7,181,731 | B2 * | 2/2007 | Pace et al. ..................... | 717/136 |
| 7,526,535 | B2 * | 4/2009 | Peck et al. ..................... | 709/220 |
| 8,037,453 | B1 * | 10/2011 | Zawadzki ...................... | 717/123 |
| 2004/0060044 | A1 * | 3/2004 | Das et al. ...................... | 717/171 |
| 2005/0240921 | A1 * | 10/2005 | Barker et al. ................ | 717/175 |
| 2005/0246703 | A1 * | 11/2005 | Ahonen ......................... | 717/172 |
| 2005/0262501 | A1 * | 11/2005 | Marinelli et al. ............. | 717/174 |
| 2006/0015839 | A1 * | 1/2006 | Owens et al. ................ | 717/100 |
| 2006/0161892 | A1 * | 7/2006 | Anand et al. ................ | 717/120 |
| 2007/0043831 | A1 * | 2/2007 | Kessler et al. ................ | 709/219 |
| 2008/0155534 | A1 * | 6/2008 | Boss et al. ..................... | 717/178 |
| 2008/0270971 | A1 * | 10/2008 | Agrawal et al. ............... | 717/102 |
| 2008/0320441 | A1 * | 12/2008 | Ahadian et al. .............. | 717/108 |
| 2008/0320472 | A1 * | 12/2008 | Laska et al. ................... | 717/178 |

OTHER PUBLICATIONS

Greenfield, Jack, and Keith Short. "Software factories: assembling applications with patterns, models, frameworks and tools." Companion of the 18th annual ACM SIGPLAN conference on Object-oriented programming, systems, languages, and applications. ACM, 2003, pp. 16-27.*

Fayad, Mohamed E., and Douglas C. Schmidt. "Lessons learned building reusable OO frameworks for distributed software." Communications of the ACM 40.10 (1997), pp. 85-87.*

Balasubramanian, K.; Gokhale, A.; Karsai, G.; Sztipanovits, J.; Neema, S.; "Developing applications using model-driven design environments," Computer, Feb. 2006, vol. 39, No. 2, pp. 33-40.*

* cited by examiner

*Primary Examiner* — Satish Rampuria
(74) *Attorney, Agent, or Firm* — Lowenstein Sandler LLP

(57) ABSTRACT

Embodiments relate to systems and methods for building and distributing software packages. A package manager generation tool can interface with a set of stages of a development environment to receive source code configured for a software package build. The package manager generation tool can further receive a configuration file from a web user interface, wherein the configuration file can comprise a set of commands that, when executed, can build a software package from the source code. A distribution schedule can indicate one or more distribution systems to which to distribute the software package. The package manager generation tool can distribute the software packages to the distribution systems specified by the distribution schedule.

12 Claims, 3 Drawing Sheets

BUILDING AND DISTRIBUTING SOFTWARE PACKAGES

FIELD

The present teachings relate to systems and methods for building and distributing software packages, and more particularly, to platforms and techniques for configuring a build of data received from a development environment into a software package.

BACKGROUND OF RELATED ART

Users of physical or virtual machines commonly install software packages, including package updates, to physical or virtual machines. The software packages can contain a set of related files chosen to perform a given application or task, such as, for example, a group of software applications, drivers, and/or other resources used to install and use messaging or media applications. In instances, a software package can contain application software, operating system software, drivers, patches, and/or other software components grouped as a logical set. In implementations, the package can be stored or encoded as a single file or data object.

Software package update managers exist to help a user initiate and perform software package updates, such as, for example, the "yum" (Yellowdog update manager) package update manager and the Red Hat Network Satellite systems management platform, both available from Red Hat, Inc., Raleigh, N.C., and others. In general, available software package managers are configured to interact with the set of installed packages on a client and with one or more software package repositories, to directly connect to those databases and download available package updates.

Before gaining access to or receiving a software package update, the software package is generated by an integration tool or similar component. For example, the "Buildbot" software development continuous integration tool is a system that automates the compile/test cycle sometimes required by software projects to validate code changes. For further example, the "Jenkins" extendible open source continuous integration server can perform similar functionalities. As used herein, any continuous integration tool or server, such as Buildbot and Jenkins, can be referred to as "build system." In particular, a build system is configured to build and test source code when the source code changes, or in other situations, to allow developers to remedy errors that the developers may not otherwise have been aware.

However, developers or other entities can have difficulty in actually providing source code to a build system or other tools to be built into a software package. Further, once the source code is provided to the build system or other tools, generating the configurations required for the build can prove difficult. Therefore, it may be desirable to provide systems and methods for building and distributing software packages. Further, it may be desirable to provide systems and methods for receiving locations of source code to be built into software packages and generating configuration commands for the build of the software packages.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for building and distributing software packages. More particularly, embodiments relate to platforms and techniques for configuring a build of data received from a development environment into a software package. In embodiments, a package manager generation tool or other logic can receive an indication of source code available from a development environment or similar resource. The package manager generation tool can detect a location of the source code and retrieve the source code for configuration.

Further, in embodiments, a configuration file can be received from a web user interface or other resource, and can specify commands that can be used to build a software package from the source code. For example, a user can access the web user interface and input commands or other data for translation by the web user interface. The package manager generation tool or other logic can be configured to execute the configuration file to build the software package, and distribute the software package to one or more distribution systems. For example, the package manager generation tool or other logic can examine a distribution schedule or similar data to determine which of the distribution systems are to receive the software package.

Reference will now be made in detail to exemplary embodiments of the present teachings, which are illustrated in the accompanying drawings. Where possible the same reference numbers will be used throughout the drawings to refer to the same or like parts.

Figure 1:
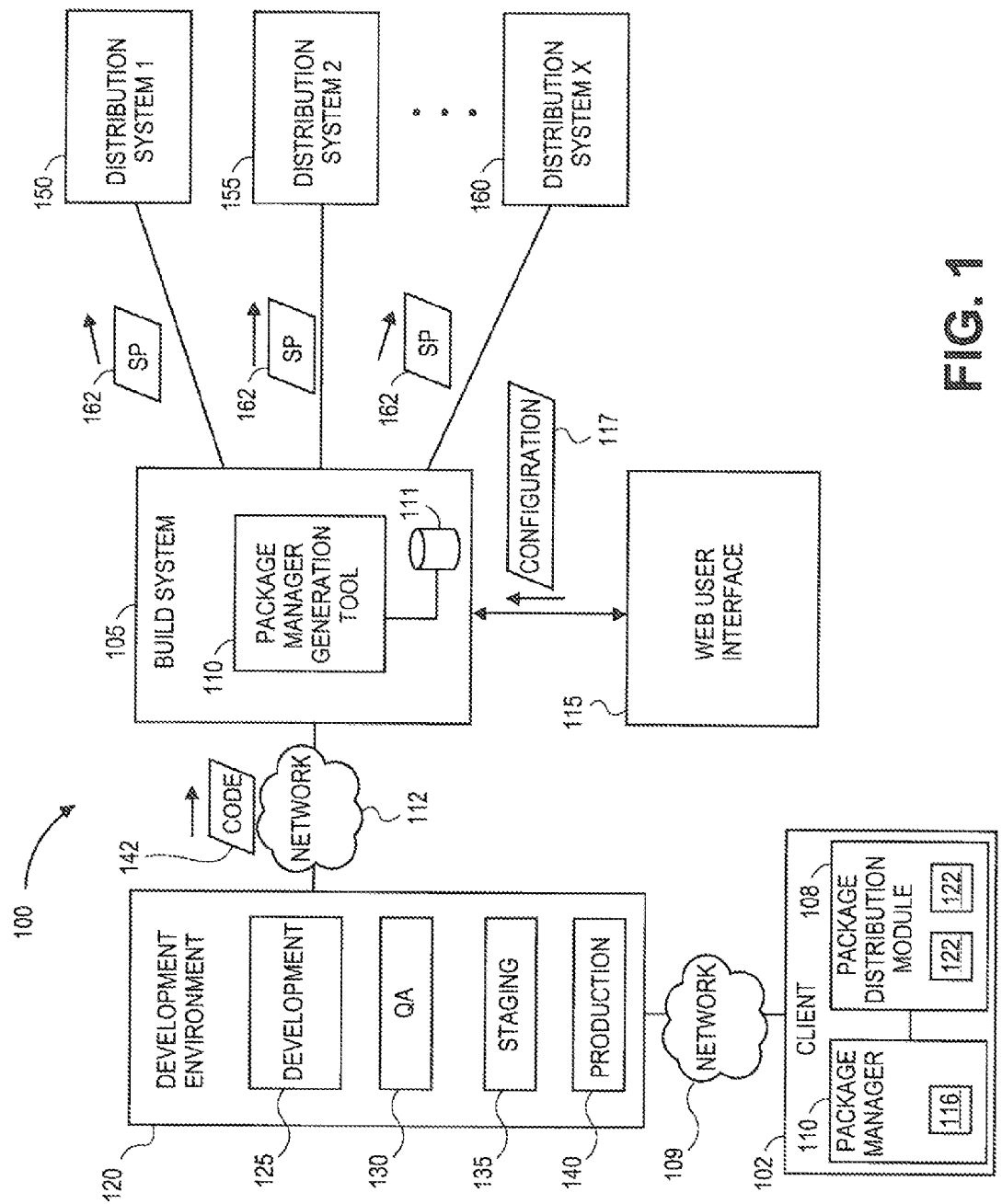
FIG. 1 illustrates an overall network in which systems and methods for building and distributing software packages can be implemented, according to various embodiments.

FIG. 1 illustrates an exemplary system 100 in which systems and methods for building and distributing software packages can be implemented. As shown in FIG. 1, the system 100 can comprise a build system 105 such as, for example, the "Buildbot" and "Jenkins" tools available from Red Hat, Inc., Raleigh, N.C., and others, that can be configured to connect with a development environment 120. In embodiments, the development environment 120 can comprise a set of stages, levels, phases, or the like, and can be a part of or separate from the build system 105 or components thereof. For example, the development environment 120 can comprise a development stage 125, a quality assurance (QA) stage 130, a staging stage 135, a production stage 140, and/or other stages. It should be appreciated that the development environment 120 is merely exemplary and can comprise additional stages. The development environment 120 can be connected to the build system 105 via a network 112, such as the public Internet or other public or private networks.

In embodiments, the development stage 125 can refer to the stage in which source code relating to a software package is programmed, coded, or otherwise developed, by, for example, end customers, developers, or other entities. Further, in embodiments, the QA stage 130 can refer to the stage in which the source code is tested or monitored to ensure function and quality. In embodiments, the staging stage 135 can refer to the stage in which the source code and/or applications associated with the source code can be executed, consumed, or monitored in a mirrored or similar environment to a production environment. In embodiments, the production stage 140 can refer to the stage in which the source code and/or applications associated with the source code can be served to end users, clients, or customers.

As shown in FIG. 1, the system 100 can further comprise a client 102 configured to store, execute, and otherwise host a variety of resources including a package manager 110 and a package distribution module 108. In embodiments, the package manager 110 can be or can include a software application, a utility, an application programming interface (API) to an operating system of the client 102, a service, and/or other local or remote logic or resources. According to embodiments, the package manager 110 can access and manage a set of software packages 116 for the client 102, and other hardware, software, and resources, to run, edit, update, configure, and otherwise manage the set of software packages in software package repositories 122 to be installed on or already installed on target machines of stages in the development environment 120. In embodiments, the package manager 110 can be or can include one or more commercially and/or publicly available package manager applications or resources, such as the "yum" package update manager available from Red Hat, Inc., Raleigh, N.C., and others, based on or compatible with platforms such as the Red Hat package manager (RPM) platform, the "DEB" package platform as used by debian and ubuntu, or others. As used herein, the packages used by various platforms can be referred to as "software packages."

In embodiments, the software packages in the software package repositories 122 can be or include packages comprising various types of applications, such as, for example, messaging applications, spreadsheet or modeling applications, social networking applications, word processing applications, and/or other applications or utilities, and can in embodiments include an operating system, drivers, and/or components. The software packages in the software package repositories 122 can have an associated set of package attributes which can record file names, versions, dates, software requirements, and/or other attributes related to software package updates installed on the target machines of the development environment 120 and reflected in software packages in the software package repositories 122.

The package manager 110 can communicate with a network interface configured to connect to one or more networks 109, such as the public Internet or other public or private networks, to deliver the set of software packages 116 to the target machines of the development environment 120. Further, the package manager 110 can connect to one or more package distribution modules 108 hosting software package repositories 122 including software package updates, and/or other software or resources.

In embodiments, the package manager 110 can communicate with the package distribution module 108. In embodiments, the package distribution module 108 is separate from the package manager 110, and can manage the development of software packages, such as set of software packages 116, within the development environment 120. The package manager 110 can also interact and/or communicate with the set of software packages 116 and the one or more software package repositories 122 to initiate, configure, test, update, and/or otherwise manage the set of software packages 116 operating on the client 102 and the target machines in the development environment 120. The package distribution module 108 can, for example, provide a user with a set of package update options displayed via a user interface (not shown in figures), such as a graphical user interface or others, to select various test, configuration, and/or other management activities on the set of software packages 116. For example, a user can select to initiate an update on one or more of the set of software packages 116 or install a new package update on the target machines of the development environment 120 via the network 115.

According to the present embodiments, the build system 105 can be configured to receive source code 142 from the development environment 120 via the network 112 or other connections. In embodiments, the source code 142 can be a software package or any type of data configured to be built into a software package for distribution. Further, the source code 142 can correspond to data distributed to the development environment 120 from the package manager 110 of the client 102. In embodiments, the source code 142 can be received from any of the stages (125, 130, 135, and 140) of the development environment 120.

In embodiments, an owner or administrator associated with the build system 105 or another entity can receive an indication that the source code 142 is available to be built into a software package. For example, the indication can be a uniform resource locator (URL), memory location, or any other type of address or location indication that can specify a location at which the source code 142 is stored or otherwise available. In response to receiving the indication, the build system 105 can be configured to retrieve the source code 142 from the development environment 120, or access the source code 142 directly from the development environment 120.

According to embodiments, a web user interface 115 can be configured to interface with the build system 105 or other entities of the system 100. For example, the web user interface 115 can be the "loki" tool available from Red Hat, Inc., Raleigh, N.C., and others, that can be used to manage the build system 105. In embodiments, the web user interface 115 can be configured to receive input from a user, owner, administrator, or other entity. For example, the input can be commands that can be used to generate a configuration file associated with building and distributing software packages. The web user interface 115 can translate or convert any input received into configuration data 117 that can be, for example, any data comprising code, commands, or other forms of data that can be accessed and/or executed by the build system 105. The web user interface 115 can be configured to provide the configuration data 117 to the build system 105 for associated processing. In embodiments, the web user interface 115 can be configured to provide the received input to the package manager generation tool 100 for translation or conversion by the package manager generation tool 100.

To configure a build of a software package, according to embodiments, the package manager generation tool 110 of the build system 105 can be configured to receive the configuration data 117 from the web user interface 115. In embodiments, the configuration data 117 can be received from a network such as a local network, the public Internet, or other public or private networks. In further embodiments, the package manager generation tool 110 can be configured to store the configuration data 117 in local or remote storage, such as a repository 111 as shown in FIG. 1.

The package manager generation tool 110 can be configured to execute the configuration data 117 in conjunction with the source code 142 received from the development environment 120 to generate a build of a software package 162 ("SP"). In particular, the configuration data 117 can specify a set of steps, commands, instructions, or the like, that are necessary to build the software package 162 from the code 142. It should be appreciated that other formats associated with a software package build are envisioned.

According to embodiments, once the software package 162 is generated, the package manager generation tool 110 can be configured to transmit, transport, send, or otherwise provide the software package 162 to one or more distribution systems 150, 155, 160. In embodiments, the one or more distribution systems 150, 155, 160 can be located remote from or in general proximity to the build system 105. For example, the one or more distribution systems 150, 155, 160 can be connected to the build 105 via a local network, the public Internet, or other public or private networks.

In embodiments, the package manager generation tool 110 can be configured to examine a distribution schedule that can outline or indicate particular distribution systems to which to send the software package 162. In embodiments, an owner, administrator, or other entity associated with the build system 105, the one or more distribution systems 150, 155, 160, or other entities can create, manage, or otherwise update the distribution schedule, which can be stored in the repository 111 or other resources associated with the system 100. In other embodiments, the owner, administrator, or other entity, can manually or directly specify which of the one or more distribution systems 150, 155, 160 are to receive the software package 162. The package manager generation tool 110 or other logic can proceed to send one or more copies of the software package 162 to any or all of the one or more distribution systems 150, 155, 160, according to the distribution schedule, or other inputs or factors. In embodiments, the one or more distribution systems 150, 155, 160 can receive the software package 162 and avail the software package 162 for downloading or accessing by users, entities, or other resources.

Figure 2:
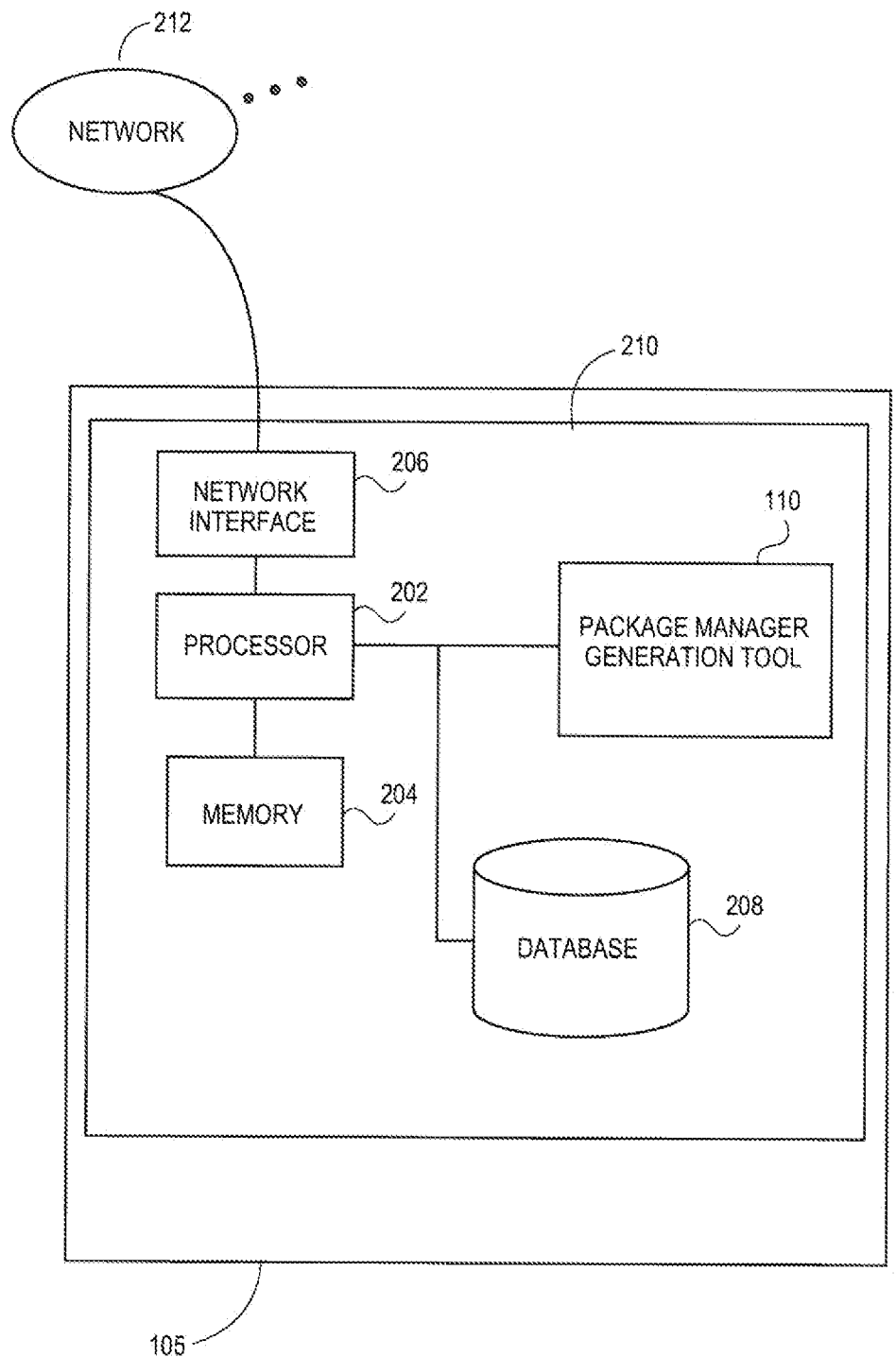
FIG. 2 illustrates exemplary hardware and other resources of a client machine that can be used in systems and methods for building and distributing software packages, according to various embodiments.

FIG. 2 illustrates an exemplary diagram of hardware and other resources that can be incorporated in the build system 105 and/or components thereof configured to manage versions of a software application in a development environment. As shown, the build system 105 can comprise a processor 202 communicating with memory 204, such as electronic random access memory, operating under control of or in conjunction with an operating system 210. The operating system 210 can be, for example, a distribution of the Linux™ operating system, the Unix™ operating system, or other open-source or proprietary operating system or platform. The processor 202 can also communicate with storage 208, such as a database stored on a local hard drive, or other networked or persistent storage. In embodiments, the software packages built by the package manager generation tool 110 can be stored in the storage 208. The processor 202 can further communicate with a network interface 206, such as an Ethernet or wireless data connection, which in turn communicates with one or more networks 212, such as the Internet or other public or private networks. The processor 202 can also communicate with the package manager generation tool 110 and/or other resources to execute control logic and control the management and/or building of software packages. Other configurations of the build system 105, including processor and memory resources, associated network connections, and other hardware and software resources are possible.

Figure 3:
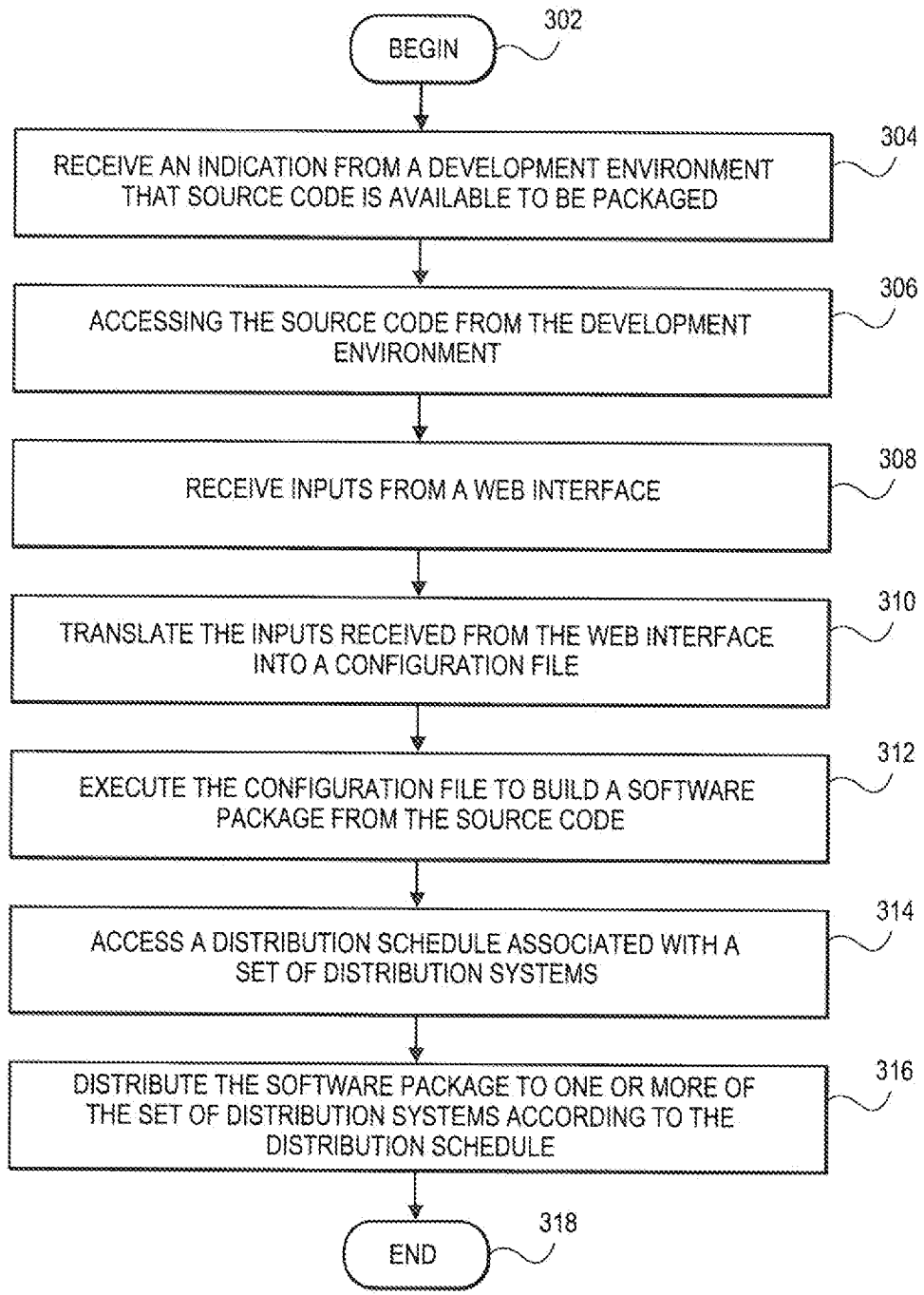
FIG. 3 illustrates a flowchart of software package management that can be used in systems and methods for building and distributing software packages, according to various embodiments.

FIG. 3 illustrates an overall processing flowchart of software package distribution that can be used in systems and methods for distributing software packages, according to various embodiments. In 302, processing can begin. In 304, an indication can be received from a development environment that source code is available to be packaged. In embodiments, the development environment can comprise a set of stages, levels, phases, or the like, associated with the development of source code related to a software package. Further, in embodiments, the indication can comprise a location, such as a URL, at which the source code is stored or otherwise available. In 306, the source code can be accessed from the development environment. In embodiments, the source code can be retrieved from the development environment by a package manager generation tool, or other logic, as discussed herein.

In 308, inputs can be received via a web interface. In embodiments, the inputs can be received from a user accessing the web interface, and can specify how the source code is to be built into a software package. In 310, the inputs received from the web interface can be translated into a configuration file. In embodiments, the configuration file can be generated by the web interface and provided to the package manager generation tool, or other logic. In 312, the configuration file can be executed to build a software package from the source code. In embodiments, the configuration file can convert the source code into the software package in a format of a distribution system. In 314, a distribution schedule associated with a set of distribution systems can be accessed. In embodiments, an owner or administrator associated with the package manager generation tool, or other logic or entities, can create and update the distribution schedule. In 316, the software package can be distributed to one or more of the set of distribution systems according to the distribution schedule. In embodiments, the owner or administrator can explicitly select which of the set of distribution system are to receive the software package. In 418, processing can end, repeat or return to any of the previous stages.

The foregoing description is illustrative, and variations in configuration and implementation may occur to persons skilled in the art. For example, while embodiments have been described in which a unitary package manager generation tool is configured to manage software package development, in embodiments, multiple modules or software can interact to control the downloading, installation, generation, distribution, and other management of software packages. While embodiments have been described in which package update activity is conducted on one client 102, in other embodiments, multiple local or remote targets, clients, and/or other machines can register to package manager 110, package distribution module 108, and/or other logic or resources to receive or perform package update activity. Other resources described as singular or integrated can in embodiments be plural or distributed, and resources described as multiple or distributed can in embodiments be combined. The scope of the present teachings is accordingly intended to be limited only by the following claims.

What is claimed is:

1. A method, comprising:
 receiving, by a processor, an indication that a source code is available to be built into a software package, wherein the indication comprises a locator identifying a location of the source code;
 retrieving the source code using the locator;
 receiving an input from a user interface;
 translating the input received from the user interface to a plurality of commands to build a software package from the source code;
 generating a configuration file in view of the plurality of commands;
 building the software package in view of a format of a distribution system of a plurality of distribution systems by using the configuration file; and
 distributing, in view of a configuration setting and a distribution schedule, the software package to the distribution system of the plurality of distribution systems, wherein the distribution schedule is associated with the plurality of distribution systems.

2. The method of claim 1, wherein the locator identifies a development environment.

3. The method of claim 1, wherein the locator comprises a uniform resource locator (URL).

4. The method of claim 1, wherein building the software package by using the configuration file comprises executing the plurality of commands.

5. The method of claim 1, wherein distributing the software package comprises:
receiving an identifier of the distribution system.

6. The method of claim 1, further comprising storing the software package in a repository.

7. A system, comprising:
an interface to a plurality of distribution systems; and
a processor communicatively coupled to the plurality of distribution systems, the processor to:
receive an indication that a source code is available to be built into a software package, wherein the indication comprises a locator identifying a location of the source code;
retrieve the source code using the locator;
receive an input from a user interface;
translate the input received from the user interface to a plurality of commands to build a software package from the source code;
generate a configuration file in view of the plurality of commands;
build the software package in view of a format of a distribution system of the plurality of distribution systems by using the configuration file; and
distribute, in view of a configuration setting and a distribution schedule, the software package to the distribution system of the plurality of distribution systems, wherein the distribution schedule is associated with the plurality of distribution systems.

8. The system of claim 7, wherein the locator identifies a development environment.

9. The system of claim 7, wherein the locator comprises a uniform resource locator (URL).

10. The system of claim 7, wherein building the software package by using the configuration file comprises executing the plurality of commands.

11. The system of claim 7, wherein distributing the software package comprises:
receiving an identifier of the distribution system.

12. The system of claim 7, wherein the processor is further to store the software package in a repository.

* * * * *